US005521544A

United States Patent [19]

Hatanaka

[11] Patent Number: 5,521,544

[45] Date of Patent: May 28, 1996

[54] MULTIPLIER CIRCUIT HAVING CIRCUIT WIDE DYNAMIC RANGE WITH REDUCED SUPPLY VOLTAGE REQUIREMENTS

[75] Inventor: Kazuomi Hatanaka, Ikoma, Japan

[73] Assignee: Sharp Kabushiki Kaisha, Japan

[21] Appl. No.: 325,596

[22] Filed: Oct. 19, 1994

[30] Foreign Application Priority Data

Nov. 16, 1993 [JP] Japan .................................... 5-287050

[51] Int. Cl.[6] ........................................................ G06F 7/556

[52] U.S. Cl. ........................... 327/356; 327/350; 323/315

[58] Field of Search ............................ 323/315; 327/350, 327/351, 356; 330/257

[56] References Cited

FOREIGN PATENT DOCUMENTS 60-24989 6/1985 Japan .

60-27061 6/1985 Japan .

*Primary Examiner*—John S. Heyman
*Assistant Examiner*—Jeffrey Zweizig

[57] ABSTRACT

A multiplier circuit including a first voltage supply for supplying a first voltage; a second voltage supply for supplying a second voltage; and a control section having a first terminal through which an input current flows, a second terminal through which a current equal to or a constant multiple of the input current at the first terminal flows, the first voltage being supplied to the second terminal, a third terminal through which an output current flows, and a fourth terminal through which a current equal to or a constant multiple of the output current at the third terminal. The second voltage is applied to the fourth terminal. The control section controls the output current so that a logarithm of a ratio of an absolute value of the output current to an absolute value of the input current is in proportion to a difference between the first voltage and the second voltage.

7 Claims, 7 Drawing Sheets

MULTIPLIER CIRCUIT HAVING CIRCUIT WIDE DYNAMIC RANGE WITH REDUCED SUPPLY VOLTAGE REQUIREMENTS

BACKGROUND OF THE INVENTION

1. Field of the Invention

The present invention relates to a multiplier circuit for signal processing, such as an analog multiplier circuit and an analog divider circuit.

2. Description of the Related Art

As shown in FIG. 6, in a conventional analog multiplier circuit, a power-supply line 8 is connected to the collectors and bases of transistors $Q_A$ and $Q_B$ via a resistor $R_B$. The power-supply line 8 is also connected to the collectors of transistors $Q_1$ and $Q_2$ via respective resistors $R_L$. The emitters of transistors $Q_A$ and $Q_B$ are connected to the collectors of transistors $Q_3$ and $Q_4$, respectively, and are also connected to the bases of transistors $Q_1$ and $Q_2$, respectively. The emitters of transistors $Q_1$ and $Q_2$ are connected to the collector of transistor $Q_5$. The emitters of transistors $Q_3$ and $Q_4$ are connected to the collectors of transistors $Q_6$ and $Q_7$, respectively. Between the collectors of transistors $Q_6$ and $Q_7$, a resistor r is connected. The base of transistor $Q_5$ is connected to the base and collector of transistor $Q_8$ and to an input terminal 1. The bases of transistors $Q_6$ and $Q_7$ are connected to the base and collector of transistor $Q_9$ and to an input terminal 2. The emitters of transistors $Q_6$, $Q_7$, and $Q_9$ are connected to a ground line 3 via respective resistors R. The emitters of transistors $Q_5$ and $Q_8$ are connected to ground line 3 via respective resistors Re. Input terminals 4 and 5, across which an input voltage $V_{in}$ is applied, are connected to the bases of transistors $Q_3$ and $Q_4$, respectively. The collectors of transistors $Q_1$ and $Q_2$ are connected to output terminals 6 and 7, respectively.

FIG. 7 shows a logarithm compression/decompression circuit which is a component of the analog multiplier circuit shown in FIG. 6. In FIG. 7, transistors $Q_A$, $Q_B$, $Q_1$, and $Q_2$ are transistors which are all matched with each other so as to have the same characteristics. As to the transistors $Q_A$, $Q_B$, $Q_1$, and $Q_2$, respective collector currents (emitter currents) are represented by $I_A$, $I_B$, $I_1$, and $I_2$, and respective base-emitter voltages are represented by $V_{BEA}$, $V_{BEB}$, $V_{BE1}$, and $V_{BE2}$ (not shown).

The potential difference between base-emitter voltages $V_{BEB}$ and $V_{BEA}$ is obtained as follows:

$$V_{BEA} = (kT/q) \cdot \ln(I_A/I_S) \tag{1}$$

$$V_{BEB} = (kT/q) \cdot \ln(I_B/I_S)$$

$$\begin{aligned} \Delta V_{BE(AB)} &= V_{BEB} - V_{BEA} \\ &= (kT/q) \cdot [\ln(I_B/I_S) - \ln(I_A/I_S)] \\ &= (kT/q) \cdot \ln(I_B/I_A) \end{aligned}$$

where q denotes an electric charge of an electron, k denotes Boltzmann's constant, T is the absolute temperature, and $I_S$ denotes a reverse saturated current in the transistor $Q_A$, $Q_B$, $Q_1$, and $Q_2$. Also, the potential difference between base-emitter voltages $V_{BE1}-V_{BE2}$ is represented as follows:

$$\Delta V_{BE(12)} = V_{BE1} - V_{BE2} = (kT/q) \cdot \ln(I_1/I_2) \tag{2}$$

Since the transistors $Q_A$, $Q_B$, $Q_1$, and $Q_2$ have identical characteristics, the values of $\Delta V_{BE(AB)}$ and $\Delta V_{VBE(12)}$ are equal to each other, so that the following is obtained from Equations (1) and (2):

$$I_B/I_A = I_1/I_2 \tag{3}$$

If Equation (3) is applied to the circuit of FIG. 6, the following equation is obtained:

$$(Ic - \Delta i)/(Ic + \Delta i) = (Ie - \Delta I)/(Ie + \Delta I)$$

$$\Delta I = (Ie/Ic) \cdot \Delta i$$

Herein, since $\Delta i = V_{in}/r$, and $V_{out} = 2 \cdot R_L \cdot \Delta I$, the following is obtained:

$$V_{out} = 2 \cdot (R_L/r) \cdot (Ie/Ic) \cdot V_{in}$$

Accordingly, the output voltage $V_{out}$ is a differential output in proportion to the product of the differential input voltage $V_{in}$ and Ie/Ic.

However, in such a conventional circuit in which the emitter resistors R or Re are provided between the respective transistors $Q_5$, $Q_6$, $Q_7$, $Q_8$, and $Q_9$ and ground, a supply voltage of $4 \cdot V_{BE}$ or more is required in order to apply $1 \cdot V_{BE}$ across the base and emitter of respective transistors $Q_5$, $Q_6$, $Q_7$, $Q_8$, and $Q_9$, because the circuit in FIG. 6 includes transistors of 3 stages in cascade in series with the emitter resistors R or Re. In the case of a silicon transistor, $V_{BE}$ is about 0.7 V, voltage between the emitter resistor R or Re is about 0.7 V so that a supply voltage of 2.8 V ($4 \cdot V_{BE}$) or more is required. In order to operate at a voltage lower than 2.8 V, the dynamic range of the circuit would be significantly reduced. Also, if the supply voltage is as low as $3 \cdot V_{BE}$, the dynamic range is virtually lost, and the signals may disadvantageously be distorted.

SUMMARY OF THE INVENTION

The multiplier circuit of this invention includes: a first voltage supply for supplying a first voltage; a second voltage supply for supplying a second voltage; and a controller having a first terminal through which an input current flows, a second terminal through which a current equal to or a constant multiple of the input current at the first terminal flows, the first voltage being supplied to the second terminal, a third terminal through which an output current flows, and a fourth terminal through which a current equal to or a constant multiple of the output current at the third terminal, the second voltage being applied to the fourth terminal, the a controller controlling the output current so that a logarithm of a ratio of an absolute value of the output current to an absolute value of the input current is in proportion to a difference between the first voltage and the second voltage.

In one embodiment of the invention, the multiplier circuit further includes: a first current supply connected to the second terminal, for allowing a current having a value and a direction equal to those of the current flowing through the second terminal of the controller; and a second current supply connected to the fourth terminal, for allowing a current having a value and a direction equal to those of the current flowing through the fourth terminal of the controller.

In another embodiment of the invention, the first voltage supply includes: a third current supply for generating a third current; and a first element having a first end connected to the second terminal and a second end at a fixed voltage, for receiving the third current and for generating a first drop voltage between the first and second ends, and the second voltage supply includes: a fourth current supply for generating a fourth current; and a second element having a first end connected to the fourth terminal and a second end at the fixed voltage, for receiving the fourth current and for generating a second drop voltage between the first and second ends.

In another embodiment of the invention, the first voltage is obtained by subtracting the first drop voltage from the fixed voltage, and the second voltage is obtained by subtracting the second drop voltage from the fixed voltage.

In another embodiment of the invention, the first voltage is obtained by adding the first drop voltage to the fixed voltage, and the second voltage is obtained by adding the second drop voltage to the fixed voltage.

In another embodiment of the invention, the controller is composed of NPN transistors.

In another embodiment of the invention, the controller is composed of PNP transistors.

In another embodiment of the invention, the first element is a diode and the second element is a diode.

According to the above-described construction, a logarithm of the ratio of the absolute value of the output current as a target current to the absolute value of the input current is in proportion to the potential difference between the second terminal and the fourth terminal. When the input current and the output current for the current gain control section are represented by $I_A$ and $I_B$, respectively, and the control current flowing through the first diode and the control current flowing through the second diode are represented by $I_X$ and $I_Y$, respectively, the characteristic of the current gain control section can be expressed as $I_B/I_A=I_1/I_2$. Thus it is possible to realize a multiplier circuit having a linear characteristic. In this way, a multiplier circuit which outputs the output current $I_B$ by controlling the input current $I_A$ by the current gain control section can be constructed. The multiplier circuit does not include the emitter resistor. Thus, it is unnecessary to apply $1\cdot V_{BE}$ to the emitter resistor as the dynamic range of the signal, unlike the prior art. For example, a multiplier circuit having three stages of transistors can operate at a lower supply voltage which is as low as $3\cdot V_{BE}$. At the same time, the multiplier circuit has a wide dynamic range and linear characteristics.

Thus, the invention described herein makes possible the advantages of providing a multiplier circuit having a wide dynamic range and linear response and which is operable at a low supply voltage.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described with reference to the accompanying drawings.

Figure 1:
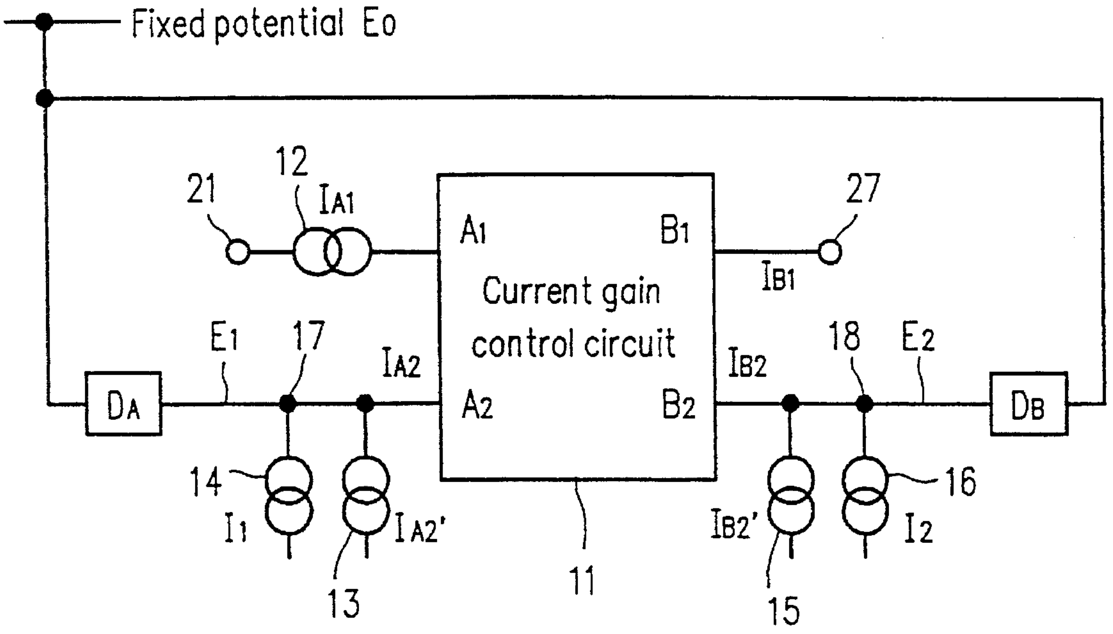
FIG. 1 is a block diagram of an analog multiplier circuit according to the invention.

Referring to FIG. 1, an analog multiplier circuit of this invention is shown including a current gain control circuit 11. The current gain control circuit 11 has terminals $A_1$, $A_2$, $B_1$, and $B_2$. To the terminal $A_1$, a current supply 12 is connected so that an input current $I_{A1}$ flows through the terminal $A_1$. The current supply 12 is connected to a current input terminal 21. To the terminal $A_2$, current supplies 13 and 14 are connected, and also a diode $D_A$ is connected. Through the terminal $B_1$ which is connected to a current output terminal 27, an output current $I_{B1}$ as a target current flows. To the terminal $B_2$, current supplies 15 and 16 are connected and also a diode $D_B$ is connected. The diodes $D_A$ and $D_B$ are connected to a node with a fixed potential $E_0$. As to the input current $I_{A1}$, there are two cases: a case where the current flows from the current supply 12 to the terminal $A_1$; and a case where the current flows from the terminal $A_1$ towards the input terminal 21. As to the output current $I_{B1}$, there are two cases: a case where the current flows from the terminal $B_1$ to the current output terminal 27; and a case where the current flows from the current output terminal 27 to the terminal $B_1$.

The current gain control circuit 11 has a characteristic that the logarithm of the ratio of the absolute value of the output current $I_{B1}$ to the absolute value of the input current $I_{A1}$ is in proportion to the potential difference between the terminals $A_2$ and $B_2$. A current $I_{A2}$ which is equal to the input current $I_{A1}$ flowing through the terminal $A_1$ or equal to a value obtained by multiplying the input current $I_{A1}$ by a constant flows through the terminal $A_2$. The current supply 13 generates a current $I_{A2}'$. In the case where the current $I_{A2}$ is output from the terminal $A_2$ of the current gain control circuit 11, the current supply 13 draws in the current $I_{A2}$ from the terminal $A_2$. When the current gain control circuit 11 receives the current $I_{A2}$ at the terminal $A_2$, the current supply 13 supplies a current having the same value as the current $I_{A2}$ to the terminal $A_2$. As a result, the current output from the terminal $A_2$ or the current generated from the current supply 13 are not input into the diode $D_A$. In order to obtain the above-described results, the current $I_{A2}'$ generated by the current supply 13 should be equal to the current $I_{A2}$. The detail of structure is explained further below.

A current $I_{B2}$ which is equal to the output current $I_{B1}$ flowing through the terminal $B_1$ or equal to a value obtained by multiplying the output current $I_{B1}$ by a constant flows through the terminal $B_1$. The current supply 15 generates a current $I_{B2}'$. In the case where the current $I_{B2}$ is output from the terminal $B_2$ of the current gain control circuit 11, the current supply 15 draws in the current $I_{B2}$ from the terminal $B_2$. When the current gain control circuit 11 receives the current $I_{B2}$ at the terminal $B_2$, the current supply 15 supplies a current having the same value as the current $I_{B2}$ to the terminal $B_2$. As a result, the current $I_{B2}$ output from the terminal $B_2$ or the current generated from the current supply 15 are not input into the diode $D_B$. In order to obtain the above-described results, the current $I_{B2}'$ generated by the current supply 15 should be equal to the current $I_{B2}$. The detail of structure is explained further below. The current supplies 14 and 16 generate control currents $I_1$ and $I_2$ so as to output the control currents $I_1$ and $I_2$ to the diodes $D_A$ and $D_B$. The control currents $I_1$ and $I_2$ flowing into the diodes $D_A$ and $D_B$ cause voltages $|E_1-E_0|$ and $|E_2-E_0|$ to appear across the diodes $D_A$ and $D_B$.

The characteristics of the current gain control circuit 11 will be described below. The control voltage at the node 17 between the diode $D_A$ and the current supply 14 is indicated by the control voltage $E_1$. The control voltage at the node 18 between the diode $D_B$ and the current supply 16 is indicated by the control voltage $E_2$. The logarithm of the ratio of the absolute value of the output current $I_{B1}$ to the absolute value of the input current $I_{A1}$ is in proportion to the potential difference between the terminals $A_2$ and $B_2$. That is, ln $(I_{B1}/I_{A1})$ is in proportion to $(E_1-E_2)$. The proportional relationship is expressed as follows:

$$\ln (I_{B1}/I_{A1})=C\cdot(E_1-E_2) \tag{4}$$

where C denotes a proportionality constant. When q denotes the charge of an electron, k denotes Boltzmann's constant, T denotes an absolute temperature, $I_0$ denotes a reverse saturated current, and $V_F$ denotes a forward voltage, the voltage-current characteristic of a diode can be defined by:

$$I=I_0\cdot exp\ [(q/kT)\cdot[V_F]] \tag{4.1}$$

Then, the voltage-current characteristic of the diodes $D_A$ and $D_B$ can be defined by:

$$I_1=I_0\cdot exp\ [(q/kT)\cdot|E_1-E_0|]$$

$$I_2=I_0\cdot exp\ [(q/kT)\cdot|E_2-E_0|]$$

From the above two equations, the relationship $E_1-E_2$ can be expressed as Equation (5) below:

$$E_1-E_2=(kT/q)\cdot\ln (I_1/I_2) \tag{5}$$

From Equations (4) and (5) above, the following equation is obtained:

$$\ln (I_{B1}/I_{A1})=C\cdot(kT/q)\cdot\ln (I_1/I_2) \tag{6}$$

If the proportionality constant C is set to be q/kT, $I_{B1}/I_{A1}=I_1/I_2$. Thus, a multiplier circuit having a linear characteristic will result. With the above-described configuration, the current $I_{B1}$ which is $I_1/I_2$ times as large as the current $I_{A1}$ generated by the current supply 12 can be obtained from the terminal $B_1$.

Figure 2:
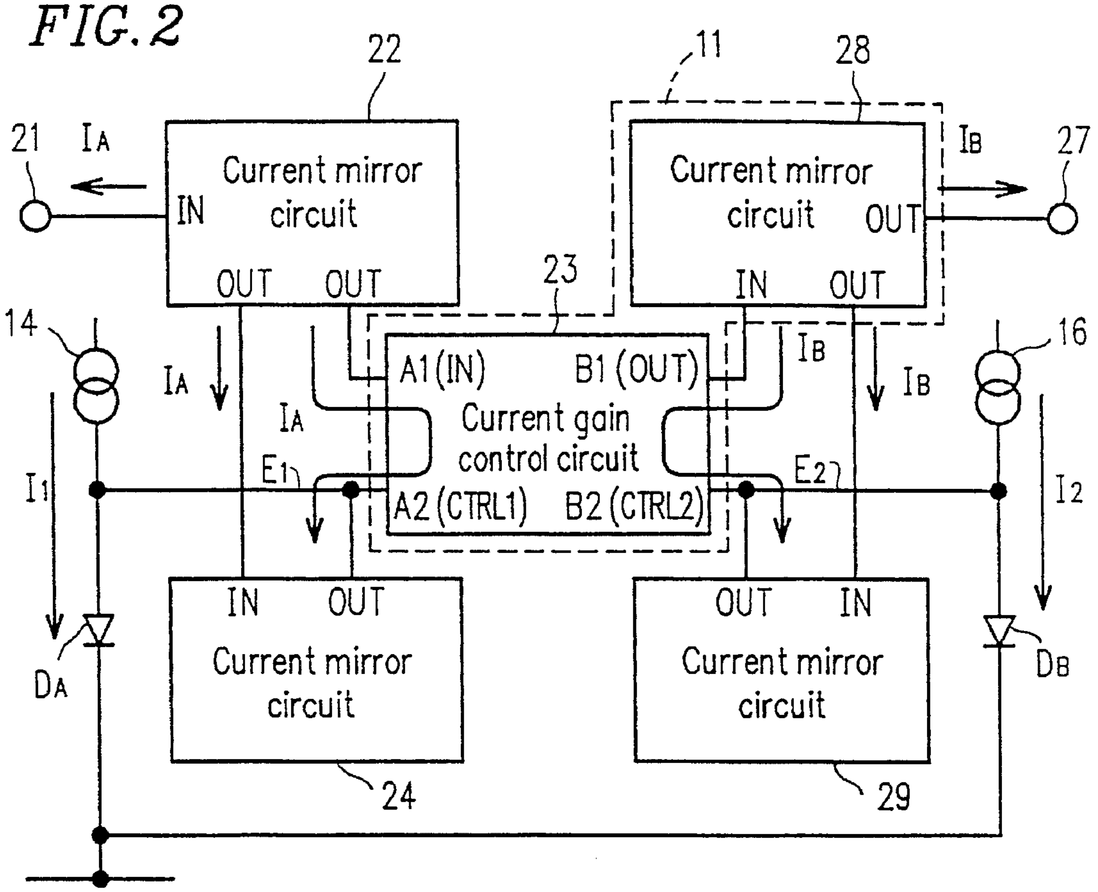
FIG. 2 is a detailed block diagram of the analog multiplier circuit of FIG. 1 according to a first embodiment.

FIG. 2 is a block diagram describing in more detail a first particular embodiment of the analog multiplier circuit of FIG. 1. The current gain control circuit 11 shown in FIG. 1 includes the current gain control circuit 23 and a current mirror circuit 28. Current mirror circuits 22, 24, and 29 represent the current supplies 12, 13, and 15 of FIG. 1, respectively, in more detail. The current mirror circuit 22 to which the current input terminal 21 is connected at its input is connected at one of its outputs to the terminal $A_1$ of a current gain control circuit 23. Another output of the current mirror circuit 22 is connected to the input of current mirror circuit 24. The terminal $A_2$ of the current gain control circuit 23 is connected to the output of the current mirror circuit 24.

The terminal $A_2$ is also connected to a connecting point of the current supply 14 allowing a control current $I_1$ to flow. The terminal $A_2$ is connected to the anode of diode $D_A$ in which the cathode thereof is connected to a fixed potential. The input of current mirror circuit 24 is connected to the output of current mirror 22.

The terminal $B_1$ of the current gain control circuit 23 is connected to the input of the current mirror circuit 28 to which the current output terminal 27 is connected at one of its outputs. Another output of current mirror circuit 28 is connected to the input of current mirror circuit 29. The terminal $B_2$ of the current gain control circuit 23 is connected to the output of current mirror circuit 29. The terminal $B_2$ is also connected to the connecting point of a current supply 16 allowing a control current $I_2$ to flow. The terminal $B_2$ is connected to the anode of diode $D_B$ in which the cathode thereof is connected to the fixed potential.

When a current $I_A$ flows from the input of the current mirror circuit 22 to the current input terminal 21, the outputs of the current mirror circuit 22 output the current $I_A$. The current $I_A$ from one of the outputs of the current mirror circuit 22 flows directly through the current gain control circuit 23 to the output of the current mirror circuit 24. The current $I_A$ from the other output of the current mirror circuit 22 is received as the input to the current mirror circuit 24. Thus, the currents $I_{A1}$, $I_{A2}$ and $I_{A2'}$ shown in FIG. 1 are all equal to $I_A$.

When the current $I_A$ flows through the current gain control circuit 23, the terminal $B_2$ of the current gain control circuit 23 passes the current $I_B$ from the output of the current mirror circuit 29 through the terminal $B_1$ and the current $I_B$ is received at the input of the current mirror circuit 28. As a result, current mirror circuit 28 outputs the current $I_B$ to the current output terminal 27 and to the input of the current mirror circuit 29 in response to the current $I_B$ received at the input of the current mirror circuit 28. Thus, the currents $I_{B1}$, $I_{B2}$ and $I_{B2'}$ shown in FIG. 1 are all equal to $I_B$.

Figure 3:
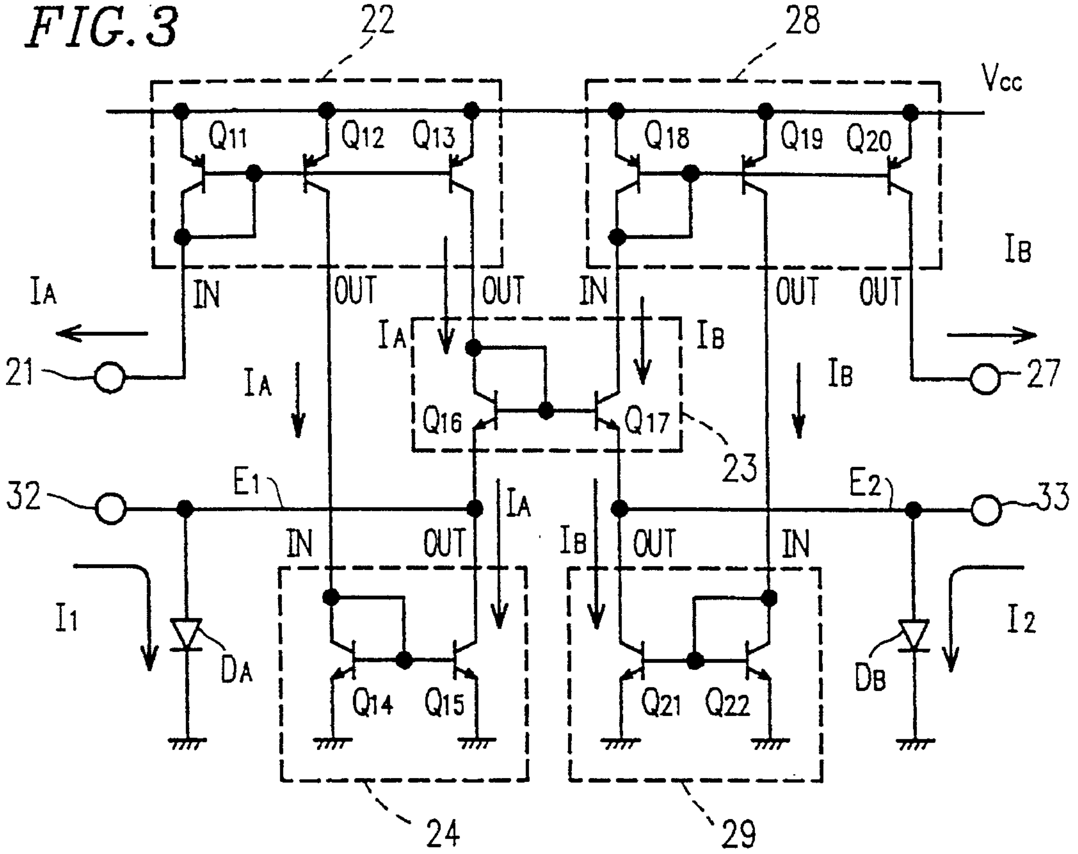
FIG. 3 is a circuit diagram showing a specific configuration of the analog multiplier circuit shown in FIG. 2.

FIG. 3 is a circuit diagram showing a specific configuration of the analog multiplier circuit shown in FIG. 2, where the fixed potential shown in FIG. 2 is ground. In FIG. 3, the current mirror circuit 22 includes transistors $Q_{11}$, $Q_{12}$, and $Q_{13}$. The transistors $Q_{11}$, $Q_{12}$, and $Q_{13}$ are supplied with power from a power supply $V_{cc}$. The bases of transistors $Q_{11}$, $Q_{12}$, and $Q_{13}$ are connected to each other. The collector and base of transistor $Q_{11}$ are connected to each other. When a current $I_A$ flows from the collector of transistor $Q_{11}$, the collectors of transistors $Q_{12}$ and $Q_{13}$ output the current $I_A$, respectively. The current mirror circuit 24 includes transistors $Q_{14}$ and $Q_{15}$. The emitters of transistors $Q_{14}$ and $Q_{15}$ are grounded. The collector and the base of transistor $Q_{14}$ and the base of transistor $Q_{15}$ are connected to the collector of transistor $Q_{12}$. When a current $I_A$ flows from the collector of transistor $Q_{14}$, the current $I_A$ flows from the collectors of transistors $Q_{15}$.

The current gain control circuit 23 consists of NPN transistors $Q_{16}$ and $Q_{17}$. The collector and the base of transistor $Q_{16}$ and the base of transistor $Q_{17}$ are connected to the collector of transistor $Q_{13}$. The emitter of transistor $Q_{16}$ is connected to the collector of transistor $Q_{15}$ and also to the anode of the diode $D_A$ in which the cathode is grounded and a control current input terminal 32. The control current input terminal 32 is connected to the current supply 14 (not shown in FIG. 3).

The current mirror circuit 28 includes transistors $Q_{18}$, $Q_{19}$, and $Q_{20}$. The transistors $Q_{18}$, $Q_{19}$, and $Q_{20}$ are supplied with power from a power supply $V_{cc}$. The bases of transistors $Q_{18}$, $Q_{19}$, and $Q_{20}$ are connected to the collector of transistor $Q_{18}$. When a current $I_B$ is output from the collector of transistor $Q_{18}$, the collectors of transistors $Q_{19}$ and $Q_{20}$ output the current $I_B$, respectively. The current mirror circuit 29 includes transistors $Q_{21}$ and $Q_{22}$. The emitters of transistors $Q_{21}$ and $Q_{22}$ are grounded. The collector and base of transistor $Q_{22}$ and the base of transistor $Q_{21}$ are connected to the collector of transistor $Q_{19}$. The collector of transistor $Q_{17}$ of the current gain control circuit 23 is connected to the collector of transistor $Q_{18}$. The emitter of transistor $Q_{17}$ is connected to the collector of transistor $Q_{21}$ and also to the anode of the diode $D_B$ in which the cathode is grounded and a control current input terminal 33. The control current input terminal 33 is connected to the current supply 16 (not shown in FIG. 3).

Herein, in the current gain control circuit 23, the input current $I_A$ is input into the collector of transistor $Q_{16}$. Very little current is input into the bases of transistors $Q_{16}$ and $Q_{17}$. The collector of transistor $Q_{17}$ is a terminal for allowing the current $I_B$ such as a target output current to flow. The target output current represents the result which is $I_1/I_2$ times as large as the current $I_A$. The emitter of transistor $Q_{16}$ is a terminal from which a current equal to the current $I_A$ such as the input current is output, and also the control current input terminal 32 to which a control voltage $E_1$ is applied. The emitter of transistor $Q_{17}$ is a terminal from which a current equal to the current $I_B$ such as the output current is output, and also the control current input terminal 33 to which a control voltage $E_2$ is applied.

With the above-described configuration, the current from the emitter of transistor $Q_{16}$ is drawn into the output of current mirror circuit 24 by inputting the current $I_A$ from the output of current mirror circuit 22 into the input of current mirror circuit 24. Accordingly, the control current $I_1$ from the control current input terminal 32 is all caused to flow to the diode $D_A$, and not to flow to the transistor $Q_{15}$ constituting the current mirror circuit 24 and the transistor $Q_{16}$ constituting the current gain control circuit 23. Therefore, the control voltage $E_1$ which is applied to the control current input terminal 32 is determined by the current $I_1$ and the diode $D_A$, irrespective of the current $I_A$. The input terminal of the entire multiplier block is the current input terminal 21 from which the current $I_A$ such as the input current flows to the current mirror circuit 22.

Similarly, the current $I_B$ from the emitter of transistor $Q_{17}$ is drawn into the output of current mirror circuit 29 by inputting the current $I_B$ from the output of current mirror circuit 28 into the input of current mirror circuit 29. Accordingly, the control current $I_2$ from the control current input terminal 33 is all caused to flow to the diode $D_B$, and not to flow to the collector of transistor $Q_{21}$ and the emitter of transistor $Q_{17}$. Therefore, the control voltage $E_2$ which is applied to the control current input terminal 33 is determined by the current $I_2$ and the diode $D_B$, irrespective of the current $I_B$.

As these transistors $Q_{16}$ and $Q_{17}$, transistors having well matched characteristics are used. The diodes $D_A$ and $D_B$ having well matched characteristics are used. Each of the diodes $D_A$ and $D_B$ can be a transistor in which the collector and the base are connected so as to function as an anode, and the emitter functions as a cathode. The transistors $Q_{16}$ and $Q_{17}$ and the transistors functioning as diodes $D_A$ and $D_B$ are all matched with each other so as to have the same characteristics.

The relationships between the collector currents $I_A$ and $I_B$ of the transistors $Q_{16}$ and $Q_{17}$ and the base-emitter voltages $V_{BE16}$ and $V_{BE17}$ of the transistors $Q_{16}$ and $Q_{17}$ will now be described. $V_{BE16}$ and $V_{BE17}$ can be represented as follows:

$$V_{BE16}=(kT/q)\cdot\ln(I_A/I_0)$$

$$V_{BE17}=(kT/q)\cdot\ln(I_B/I_0)$$

where $V_{BE16}$ and $V_{BE17}$ denote base-emitter voltages of the transistors $Q_{16}$ and $Q_{17}$, and $I_0$ denotes a reverse saturated current. When the relationship between the control currents of $E_2=E_1+V_{BE16}-V_{BE17}$ is used, $E_1-E_2$ is expressed as follows:

$$E_1-E_2=V_{BE17}-V_{BE16}=(kT/q)\cdot\ln(I_B/I_A) \quad (7)$$

Then, the control voltages $E_1$ and $E_2$ are determined by the currents respectively flowing through the diodes $D_A$ and $D_B$ as follows:

$$E_1=(kT/q)\cdot\ln(I_1/I_0)$$

$$E_2=(kT/q)\cdot\ln(I_2/I_0)$$

When the relationship shown by the above two equations is used, $E_1-E_2$ is expressed as follows:

$$\therefore E_1-E_2-(kT/q)\cdot\ln(I_1/I_2) \quad (8)$$

From Equations (7) and (8), the following is obtained.

$$(kT/q)\cdot\ln(I_B/I_A)=(kT/q)\cdot\ln(I_1/I_2)$$

$$\therefore I_B/I_A=I_1/I_2 \quad (9)$$

Equation (9) corresponds to a multiplier circuit having a linear characteristic in which the proportionality constant C of Equation (6) is q/kT.

Figure 4:
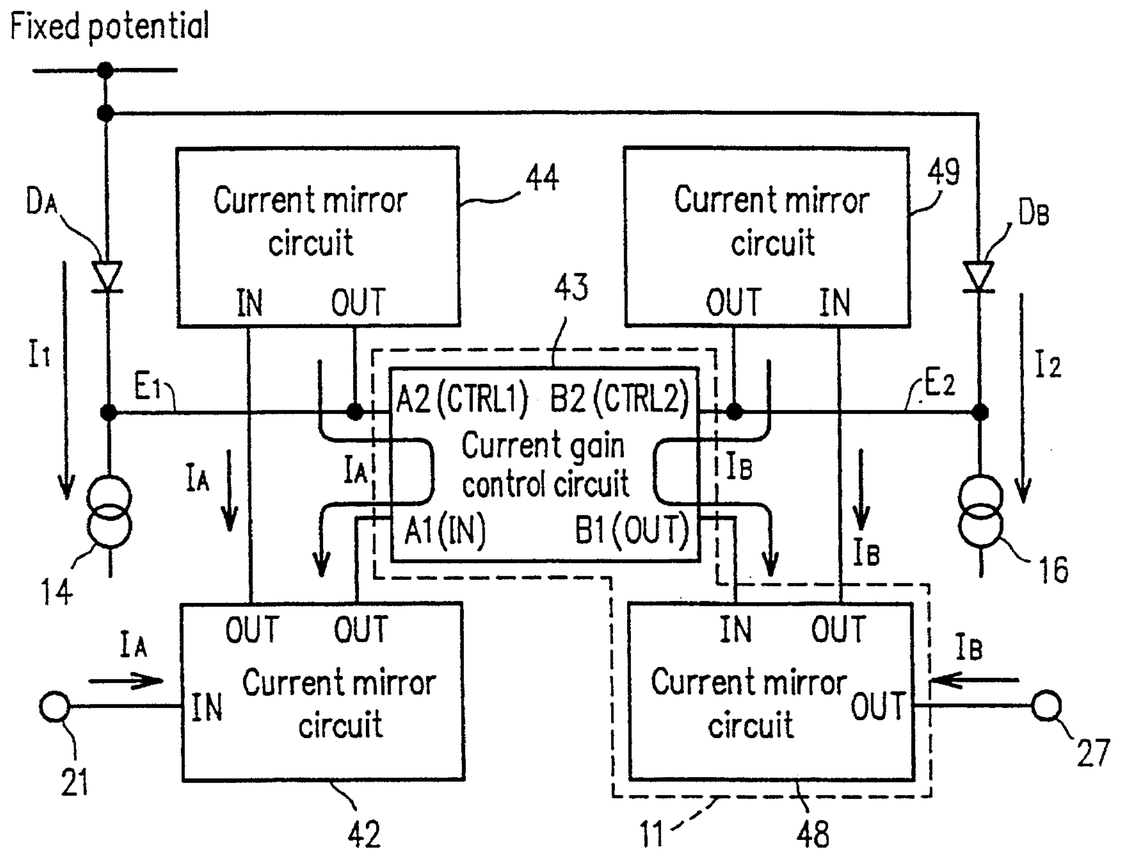
FIG. 4 is a detailed block diagram of the analog multiplier circuit of FIG. 1 according to a second embodiment.

FIG. 4 is a block diagram describing in more detail a second particular embodiment of the analog multiplier circuit shown in FIG. 1. The current gain control circuit 11 includes a current gain control circuit 43 and a current mirror circuit 48. Current mirror circuits 42, 44, and 49 represent the current supplies 12, 13, and 15 of FIG. 1, respectively, in more detail. The current mirror circuit.42 to which the current input terminal 21 is connected at its input is connected at one of its outputs to a terminal $A_1$ of a current gain control circuit 43. Another output of the current mirror circuit 42 is connected to the input of current mirror circuit 44. The terminal $A_2$ of the current gain control circuit 43 is connected to the output of current mirror circuit 44. The terminal $A_2$ is also connected to a connecting point of the current supply 14 allowing a control current $I_1$ to flow. The terminal $A_2$ is connected to the cathode of diode $D_A$ in which the anode thereof is connected to a fixed potential. The terminal $B_1$ of the current gain control circuit 43 is connected to the input of current mirror circuit 48 to which the current output terminal 27 is connected at one of outputs of current mirror circuit 48. The terminal $B_2$ of the current gain control circuit 43 is connected to the output of current mirror circuit 49.

The terminal $B_2$ is also connected to a connecting point of the current supply 16 allowing a control current $I_2$ to flow. The terminal $B_2$ is connected to the cathode of diode $D_B$ in which the anode thereof is connected to the fixed potential. The input of current mirror circuit 49 is connected to another output of current mirror circuit 48.

When a current $I_A$ flows from the current input terminal 21 to the input of the current mirror circuit 42, the outputs of the current mirror circuit 42 receive the currents $I_A$. One of the outputs of the current mirror circuit 42 receives directly the current $I_A$ from the input of current mirror circuit 44. Another output of the current mirror circuit 42 receives the current $I_A$ through the current gain control circuit 43. Thus, the currents $I_{A1}$, $I_{A2}$ and $I_{A2'}$ shown in FIG. 1 are all equal to $I_A$.

When the current $I_A$ flows through the current gain control circuit 43, the terminal $B_2$ of the current gain control circuit 43 receives the current $I_B$ from the output of current mirror circuit 49 and the terminal $B_1$ outputs the current $I_B$ to the input of the current mirror circuit 48. One of outputs of the current mirror circuit 48 receives the current $I_B$ from the current output terminal 27 and another output of it receives the current $I_B$ from the input of current mirror circuit 49. Thus, the currents $I_{B1}$, $I_{B2}$ and $I_{B2'}$ shown in FIG. 1 are all equal to $I_B$.

Figure 5:
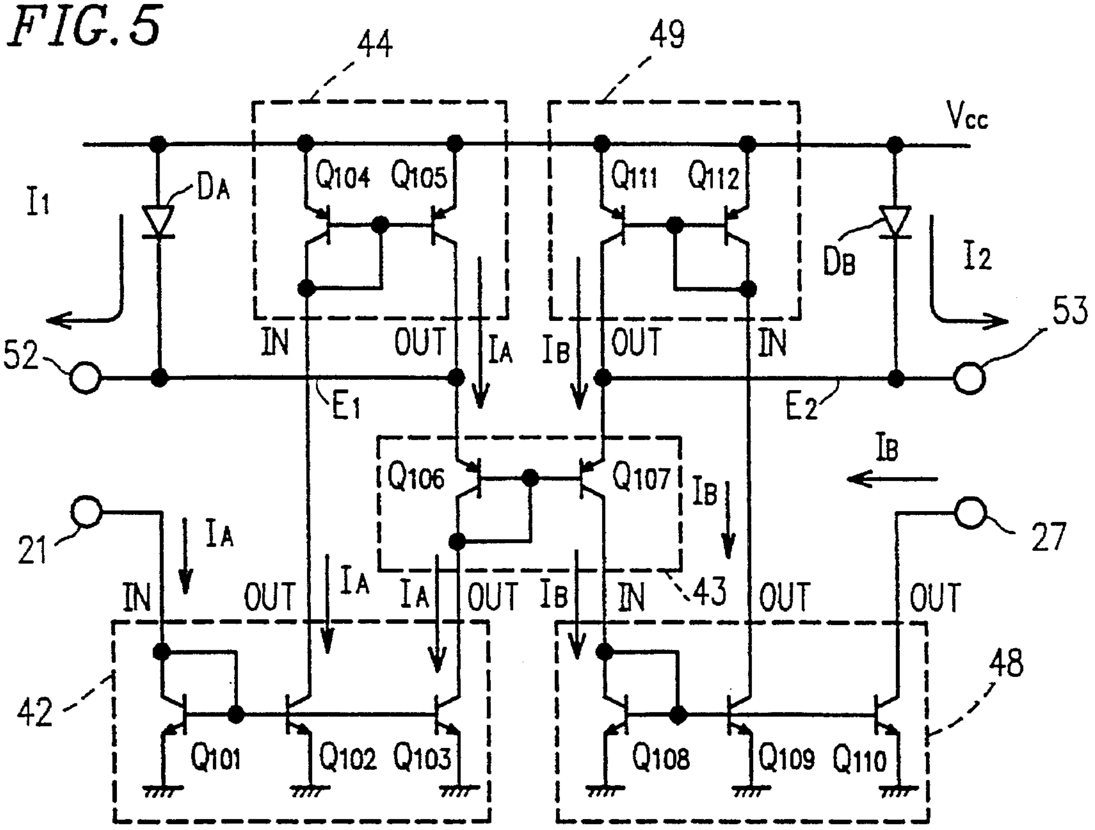
FIG. 5 is a circuit diagram showing a specific configuration of the analog multiplier circuit shown in FIG. 4.
Figure 6:
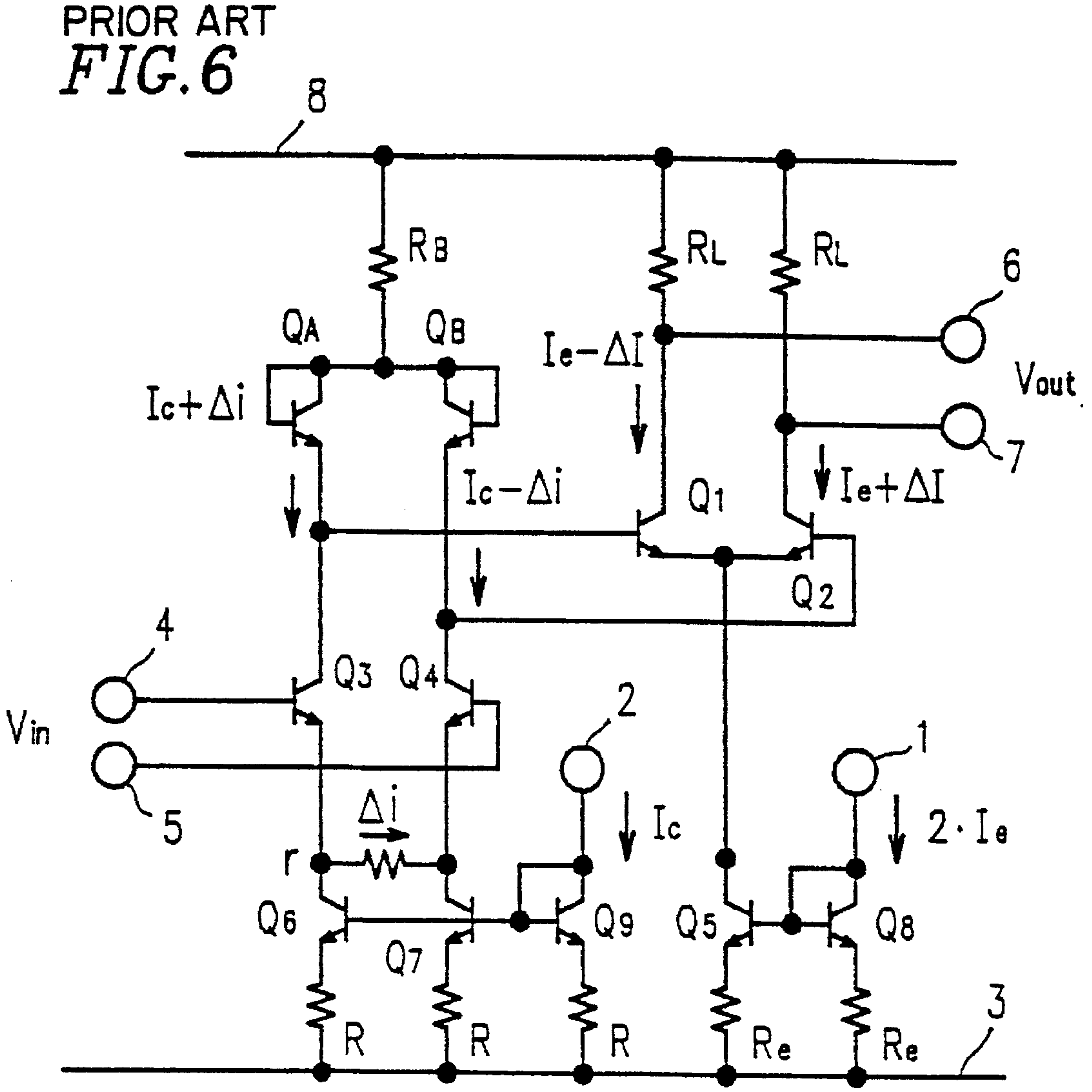
PRIOR ART FIG.6
FIG. 6 is a circuit diagram showing a specific configuration of a conventional multiplier circuit.
Figure 7:
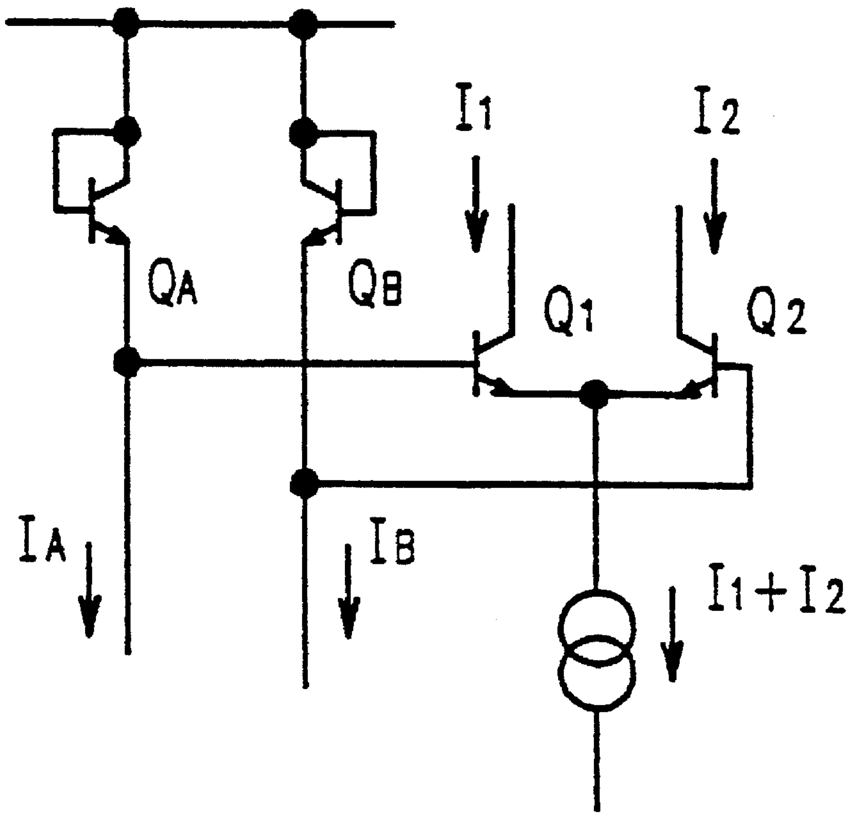
FIG. 7 PRIOR ART
FIG. 7 is a circuit diagram showing a logarithm compression/decompression circuit as a component of the analog multiplier circuit shown in FIG. 6.

FIG. 5 is a circuit diagram showing a specific configuration of the analog multiplier circuit shown in FIG. 4, where the fixed potential shown in FIG. 4 is a power supply $V_{CC}$. In FIG. 5, the current mirror circuit 42 includes transistors $Q_{101}$, $Q_{102}$, and $Q_{103}$. The emitters of transistors $Q_{101}$, $Q_{102}$, and $Q_{103}$ are grounded. The bases of transistors $Q_{101}$, $Q_{102}$, and $Q_{103}$ are connected to the collector of transistor $Q_{101}$ to which the current input terminal 21 is connected. When a current $I_A$ is input to the current input terminal 21, the collectors of transistors $Q_{102}$ and $Q_{103}$ draw in the currents $I_A$ from the collector of transistors $Q_{104}$ and $Q_{106}$, respectively. Then, the emitters of transistors $Q_{101}$, $Q_{102}$, and $Q_{103}$ output the currents $I_A$. The current mirror circuit 44 includes transistors $Q_{104}$ and $Q_{105}$. These transistors $Q_{104}$ and $Q_{105}$ are power-supplied from a power supply $V_{cc}$, and the current $I_A$ is output to the respective collectors when the current $I_A$ is input to the current mirror circuit 44. The collector and base of transistor $Q_{104}$ and the base of transistor $Q_{105}$ are connected to the collector of transistor $Q_{102}$. The current gain control circuit 43 consists of PNP transistors $Q_{106}$ and $Q_{107}$. The collector and base of transistor $Q_{106}$ and the base of transistor $Q_{107}$ are connected to the collector of transistor $Q_{103}$. The emitter of transistor $Q_{106}$ is connected to the collector of transistor $Q_{105}$ and also to the cathode of the diode $D_A$ in which the anode is connected to the power supply $V_{cc}$ and a control current input terminal 52. The current input terminal 52 is connected to the current supply 14 (not shown in FIG. 5).

The current mirror circuit 48 includes transistors $Q_{108}$, $Q_{109}$, and $Q_{110}$. The emitters of transistors $Q_{108}$, $Q_{109}$, and $Q_{110}$ are grounded. The bases of transistors $Q_{108}$, $Q_{109}$, and $Q_{110}$ are connected to the collector of transistor $Q_{108}$. When the current $I_B$ flows to the collector of transistor $Q_{107}$, the current $I_B$ flows to the collectors of the transistors $Q_{108}$, $Q_{109}$, and $Q_{110}$. The current mirror circuit 49 includes transistors $Q_{111}$ and $Q_{112}$. The collector and the base of transistor $Q_{112}$ and the base of transistor $Q_{111}$ are connected to the collector of transistor $Q_{109}$. The collector of transistor $Q_{107}$ of the current gain control circuit 43 is connected to the collector of the transistor $Q_{108}$. The emitter of the transistor $Q_{107}$ is connected to the collector of the transistor $Q_{111}$ and also to the cathode of the diode $D_B$ in which the anode is connected to the power supply $V_{cc}$ and a control current input terminal 53. The current input terminal 53 is connected to the current supply 16 (not shown in FIG. 5).

Herein, in the current gain control circuit 43, the current $I_A$ is output from the collector of transistor $Q_{106}$ and very little current flows from the bases of transistors $Q_{106}$ and $Q_{107}$. The collector of transistor $Q_{107}$ is a terminal for outputting the current $I_B$ such as a target output current. The target output current represents the result which is $I_1/I_2$ times as large as the current $I_A$. The emitter of transistor $Q_{106}$ is a terminal to which a current equal to the current $I_A$ such as the input current is input, and also a terminal to which a control voltage $E_1$ is applied. The emitter of the transistor $Q_{107}$ is a terminal to which a current equal to the current $I_B$ such as the output current is input, and also a terminal to which a control voltage $E_2$ is applied.

With the above-described configuration, the current mirror circuit 42 draws in the current $I_A$ from the current mirror circuit 44 and the collector of the transistor $Q_{106}$. In order to output the current $I_A$ from the collector of the transistor $Q_{106}$, all the current $I_A$ output from the transistor $Q_{105}$ should be input into the emitter of the transistor $Q_{106}$. Accordingly, the control current $I_1$ through the control current input terminal 52 is all caused to flow to the diode $D_A$, and not to flow to the transistors $Q_{104}$, $Q_{105}$ and $Q_{106}$. Therefore, the control voltage $E_1$ which is applied to the control current input terminal 52 is determined by a power supply $V_{cc}$, the current $I_1$ and the diode $D_A$, irrespective of the current $I_A$. The input terminal of the entire multiplier block is the current input terminal 21 to which the input current flows to the current mirror circuit 42.

Similarly, the current mirror circuit 48 draws in the current $I_B$ from the current mirror circuit 49 and the collector of the transistor $Q_{107}$. In order to output the current $I_B$ from the collector of the transistor $Q_{107}$, all the current $I_B$ output from the transistor $Q_{111}$ should be input into the emitter of the transistor $Q_{107}$. Accordingly, the control current $I_2$ through the control current input terminal 53 is all caused to flow to the diode $D_B$, and not to flow to the transistors $Q_{107}$, $Q_{111}$, and $Q_{112}$. Therefore, the control voltage $E_2$ which is applied to the control current input terminal 53 is determined by a power supply $V_{cc}$, the current $I_2$ and the diode $D_B$, irrespective of the current $I_B$.

As these transistors $Q_{106}$ and $Q_{107}$, transistors having well matched characteristics are used. The diodes $D_A$ and $D_B$ having well matched characteristics are used. Each of the diodes $D_A$ and $D_B$ can be a transistor in which the collector and the base are connected so as to function as a cathode, and the emitter functions as an anode. The transistors $Q_{106}$ and $Q_{107}$ and the transistors functioning as diodes $D_A$ and $D_B$ are all matched with each other so as to have the same characteristics.

The relationships between the collector currents $I_A$ and $I_B$ of transistors $Q_{106}$ and $Q_{107}$ and the base-emitter voltages $V_{BE106}$ and $V_{BE107}$ of transistors $Q_{106}$ and $Q_{107}$ will now be described. $V_{BE106}$ and $V_{BE107}$ can be respected as follows:

$$V_{BE106}=(kT/q)\cdot\ln(I_A/I_{0P})$$

$$V_{BE107}=(kT/q)\cdot\ln(I_B/I_{0P})$$

where $V_{BE106}$ and $V_{BE107}$ denote base-emitter voltages of the transistors $Q_{106}$ and $Q_{107}$, and $I_{0P}$ denotes a reverse saturated current. When the relationship between the control currents of $E_2=E_1-V_{BE106}+V_{BE107}$ is used, $E_1-E_2$ is expressed as follows:

$$E_1-E_2=V_{BE106}-V_{BE107}=(kT/q)\cdot\ln(I_A/I_B) \quad (10)$$

The control voltages $E_1$ and $E_2$ are determined by the currents flowing through the diodes $D_A$ and $D_B$ as follows:

$$E_1=V_{cc}-(kT/q)\cdot\ln(I_1/I_{0P})$$

$$E_2=V_{cc}-(kT/q)\cdot\ln(I_2/I_{0P})$$

When the relationship shown by the above two equations is used, $E_1-E_2$ is expressed as follows:

$$\therefore E_1-E_2=(kT/q)\cdot\ln\,(I_2/I_1) \quad (11)$$

From Equations (10) and (11) above, the following is obtained:

$$(kT/q)\cdot\ln\,(I_A/I_B)=(kT/q)\cdot\ln\,(I_2/I_1)$$

$$\therefore I_A/I_B=I_2/I_1 \quad (12)$$

Equation (12) corresponds to a multiplier circuit having a linear characteristic in which the proportionality constant C of Equation (6) is q/kT.

In the above-described examples, the input signal is described as $I_A$. Alternatively, $I_1$ or $I_2$ can also be used as the input signal.

As described above, according to the invention, a logarithm of the ratio of the absolute value of the output current as a target current to the absolute value of the input current is in proportion to the potential difference between the second terminal and the fourth terminal. Thus it is possible to realize a multiplier circuit having a linear characteristic. The multiplier circuit outputs the output current $I_B$ by controlling the input current $I_A$ by the current gain control section. As a result, the multiplier circuit can operate with a simplified circuit configuration and at a lower voltage. Also, the multiplier circuit has a wide dynamic range and linear characteristics.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A multiplier circuit comprising:

first voltage supply means for supplying a first voltage;

second voltage supply means for supplying a second voltage; and control means having a first terminal through which an input current flows, a second terminal through which a current equal to or a constant multiple of the input current at the first terminal flows, the first voltage being supplied to the second terminal, a third terminal through which an output current flows, and a fourth terminal through which a current equal to or a constant multiple of the output current at the third terminal flows, the second voltage being applied to the fourth terminal, said control means controlling the output current so that a logarithm of a ratio of an absolute value of the output current to an absolute value of the input current is in proportion to a difference between the first voltage and the second voltage, said first voltage supply means including a first current supply for generating a third current, and a first element, having a first end connected to the second terminal and a second end at a fixed voltage, for receiving the third current and for generating a first drop voltage between the first and second ends thereof, said second voltage supply means including a second current supply for generating a fourth current, and a second element, having a first end connected to the fourth terminal and a second end at the fixed voltage, for receiving the fourth current and for generating a second drop voltage between the first and second ends thereof.

2. The multiplier circuit according to claim 1, further comprising:

a third current supply connected to the second terminal, for providing a current having a value and a direction equal to those of the current flowing through the second terminal of said control means; and a fourth current supply connected to the fourth terminal, for providing a current having a value and a direction equal to those of the current flowing through the fourth terminal of said control means.

3. The multiplier circuit according to claim 1, wherein the first voltage is obtained by subtracting the first drop voltage from the fixed voltage, and the second voltage is obtained by subtracting the second drop voltage from the fixed voltage.

4. The multiplier circuit according to claim 1, wherein the first voltage is obtained by adding the first drop voltage to the fixed voltage, and the second voltage is obtained by adding the second drop voltage to the fixed voltage.

5. The multiplier circuit according to claim 1, wherein said control means comprises NPN transistors.

6. The multiplier circuit according to claim 1, wherein said control means comprises PNP transistors.

7. The multiplier circuit according to claim 1, wherein said first element is a diode and said second element is a diode.

* * * * *